(No Model.)

G. C. BULLARD.
WHEEL TIRE AND FABRIC THEREFOR.

No. 585,181. Patented June 29, 1897.

Witnesses:
N. E. Renwick
E. A. Allen

Inventor:
Gardner C. Bullard
by his attorney
Edward S. Beach

THE NORRIS PETERS CO., PHOTO-LITHO., WASHINGTON, D. C.

UNITED STATES PATENT OFFICE.

GARDNER C. BULLARD, OF BROOKLINE, MASSACHUSETTS.

WHEEL-TIRE AND FABRIC THEREFOR.

SPECIFICATION forming part of Letters Patent No. 585,181, dated June 29, 1897.

Application filed February 1, 1897. Serial No. 621,396. (No model.)

*To all whom it may concern:*

Be it known that I, GARDNER C. BULLARD, of Brookline, in the county of Norfolk and State of Massachusetts, have invented new and useful Improvements in Wheel-Tires and in Fabrics Therefor, of which the following is a specification, reference being had to the accompanying drawings, in which—

Figure 1:
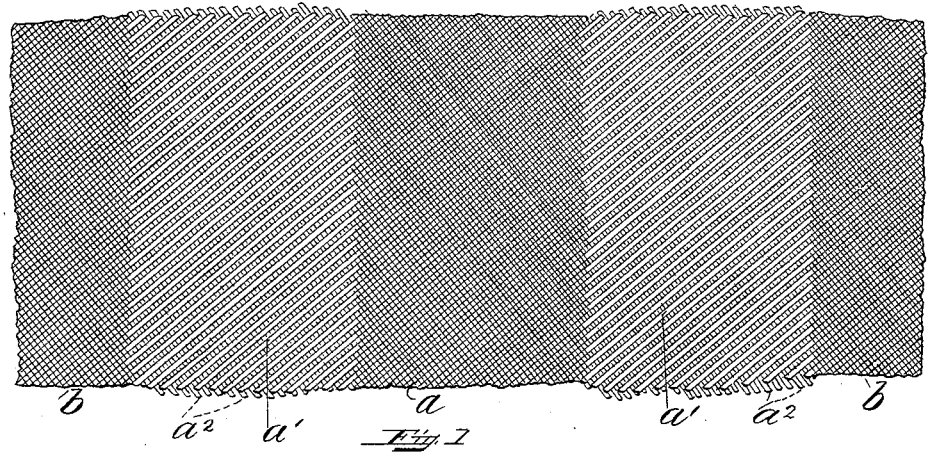
Figure 2:
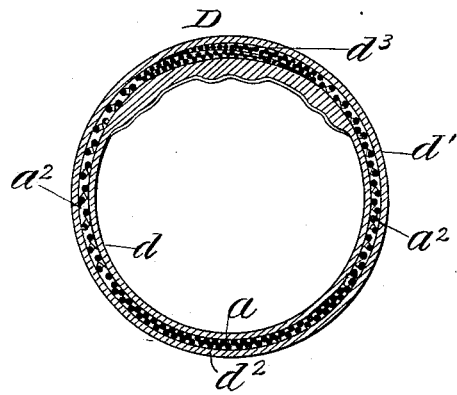

Figure 1 is a plan view of my new fabric spread out. Fig. 2 is a cross-sectional view of a wheel-tire which comprises my new fabric.

In the drawings illustrating my invention in the best way known to me my new fabric is formed with a middle portion $a$, wherein the warp-threads $a'$ are interwoven or combined and compacted in any suitable manner with the weft-threads $a^2$. This middle portion of these combined and compacted threads interwoven in any suitable manner makes a wear-resisting surface well adapted for use in bicycle and other wheel tires and tends to prevent the puncture of the tire when this surface is coincident with the tread-surface thereof. This middle compacted portion $a$ may be of any desired width, and from each side of it the individual warp and woof threads are led out diagonally and superimposed in layers, one upon the other, as shown in Fig. 1. The warp and woof threads are woven at right angles to each other, the weft-threads being interwoven with the warp-threads at that part of the fabric which forms the tread; but when the fabric is cut up into sheath-forming strips and a strip is bent transversely to take the shape of the cross-section of a tire the uninterwoven warp and woof threads on each side of the tread become disposed diagonally, as well as in the interwoven tread portion itself, as will be plain to all skilled in the art. Either set of threads (warp or woof) may form the outer layer. The length of these uninterwoven but superimposed warp and weft threads $a'$ $a^2$, extending from the edges of the middle portion $a$, will depend upon the circumference of the tire in which my new fabric is to be incorporated, and the extremities of the overlapping warp and weft threads are preferably again woven together at $b$, so as to form interwoven marginal portions of the completed fabric. This is not an essential feature of my new fabric, but is a desirable one.

If desired, the overlapping but unwoven warp and weft threads projecting from the middle woven portion $a$ may be left entirely free and secured in any desired manner; but in the present instance the edges of the marginal portions $b$ are brought toward each other in the pneumatic tire D, which is made up of an inner layer or sheath of rubber or the like $d$ and an outer envelop $d'$ of rubber or the like in the usual manner. The middle portion $a$ of my new fabric is coincident with the tread $d^2$ of the tire, and the unwoven side-forming portions $a^2$ of the fabric extend along the sides of the tire. Preferably, but not necessarily, the woven marginal portions $b$ of the new fabric are lapped one over the other $d^3$, so as to form a reinforced seating portion of the tire along the middle of its inner circumference. By this overlapping of these preferably interwoven ends or margin-forming portions of the warp and weft threads the completed tire is better enabled to resist the destructive end-thrust tendencies of the spokes of wheels. This is one feature of my invention when embodied in a wheel-tire; but the most important feature of my invention when embodied in a wheel-tire consists in the combination of the outer and inner sheaths of the tire with the intermediate fabric, having an interwoven tread-forming portion with the marginal side-forming portions of overlapping uninterwoven warp and weft threads. This construction tends to make the tread portion of the tire non-puncturable, and at the same time it permits the desired elasticity of the tire by making the side portions of the tire between the seating portion and the tread yielding and flexible.

An important advantage of my new fabric in its adaptation for wheel-tires lies in the fact that the two sets of threads or yarns which are independent one of the other along the side portions are, nevertheless, held together by the intermediate interwoven tread-forming portion $a$, so that the two sets of threads or yarns are incorporated in the tire at one operation, instead of by two or more operations, as heretofore, where tires have been formed with two or more independent fabrics consisting, practically, of parallel threads. Thus the side portion of my new tire may be said to be composed of two superimposed fabrics, one fabric consisting of the parallel warp-threads and the other fabric consisting of the parallel weft-threads. If these two sets of threads or superimposed fabrics were not interwoven along the tread portion, two operations would be necessary in combining them in the tire, for each set of threads or fabric would have to be independently applied. The fact that the middle portion $a$ is formed by interweaving the independent threads forming the side portions of the tire obviates the necessity of applying an independent reinforcing-strip of fabric at the tread and saves labor in this connection. My new construction also effects a considerable saving of rubber by reason of the fact that a single calendering operation is all that is required to put the requisite amount of rubber upon the outside of the fabric when arranged in tubular form, whereas in other forms of this class of tires a calendering operation has been required for each layer of fabric, and each calendering operation involves the use of more or less rubber, which is the expensive material in tires of this class.

What I claim is—

1. In a wheel-tire, the combination of outer and inner sheaths with an intermediate fabric having an interwoven tread portion composed of warp and weft threads, and adjacent side-forming portions of uninterwoven, crossed warp and weft threads.

2. In a wheel-tire, the combination of outer and inner sheaths with an intermediate fabric having an interwoven, tread-forming portion; uninterwoven, crossed threads extending from the sides of the woven, tread-forming portion toward the middle inner circumferential line of the tire, and interwoven marginal portions.

3. In a wheel-tire, the combination of outer and inner sheaths with an intermediate fabric having an interwoven, tread-forming portion, the side-forming portions comprised of uninterwoven crossed warp and weft threads, the extremities of which are interwoven and lapped along the seat portion of the tire.

4. As a new article of manufacture, the new fabric herein described, the same comprising a middle portion of interwoven warp and weft threads and adjacent side portions of uninterwoven, crossed warp and weft threads.

5. As a new article of manufacture, the new fabric herein described, the same comprising a middle portion of interwoven warp and weft threads and adjacent side portions of uninterwoven, crossed warp and weft threads, which are interwoven at their extremities.

In testimony whereof I have signed my name to this specification, in the presence of two subscribing witnesses, on this 23d day of January, A. D. 1897.

GARDNER C. BULLARD.

Witnesses:
 EDWARD S. BEACH,
 E. A. ALLEN.